United States Patent [19]

Kummer

[11] Patent Number: 4,523,545

[45] Date of Patent: Jun. 18, 1985

[54] APPARATUS FOR REMOVING A MILKING SET OF A MILKING MACHINE, PARTICULARLY FOR A COW-SHED

[75] Inventor: Jan Kummer, Leeuwarden, Netherlands

[73] Assignee: Kummer Electronics B.V., Leeuwarden, Netherlands

[21] Appl. No.: 505,211

[22] Filed: Jun. 17, 1983

[30] Foreign Application Priority Data

Jun. 17, 1982 [NL] Netherlands ........................ 8202453

[51] Int. Cl.$^3$ .............................................. A01J 7/00
[52] U.S. Cl. ................................ 119/14.08; 119/14.14
[58] Field of Search ............... 119/14.08, 14.14, 14.15, 119/14.01

[56] References Cited

U.S. PATENT DOCUMENTS

| 3,878,819 | 4/1975 | Harman ........................... 119/14.08 |
| 3,884,187 | 5/1975 | Massie et al. ..................... 119/14.14 |
| 4,114,565 | 9/1978 | Dode et al. ....................... 119/14.01 |
| 4,391,222 | 7/1983 | Icking et al. ..................... 119/14.17 |

FOREIGN PATENT DOCUMENTS 0001667  5/1979  European Pat. Off. ......... 119/14.08

Primary Examiner—Hugh R. Chamblee
Attorney, Agent, or Firm—Murray Schaffer

[57] ABSTRACT

A milking cluster is provided with a vertically suspended cylinder in which a movable piston is located. A lifting cord is attached at one end to the milking cluster and at the other end to the upper face of the piston. It extends upwardly from the piston, leaving the upper end of the cylinder and is guided over a pulley thereafter extending downwardly to the milking cluster. The apparatus includes a milk flow indicator.

9 Claims, 7 Drawing Figures

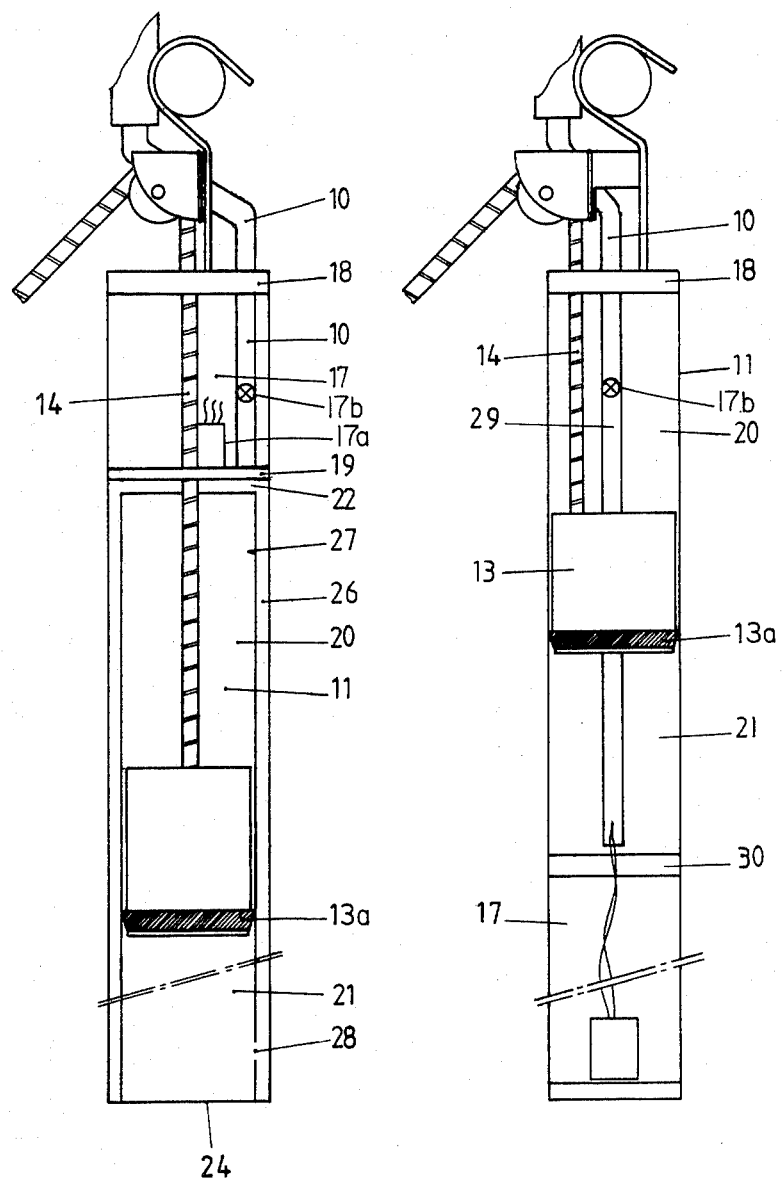

APPARATUS FOR REMOVING A MILKING SET OF A MILKING MACHINE, PARTICULARLY FOR A COW-SHED

BACKGROUND OF THE INVENTION

The present invention relates to apparatus for removing and lifting the milking cluster of an automatic milking system, upon depletion of the flow of milk from the cow.

It has been known to provide apparatus for removing the cluster from the cow's udder and to lift the same so that it does not scrape along the floor of the barn. Such apparatus has consisted of a substantially vertically suspended cylinder having a movable piston, the milking cluster being connected to the piston by means of a lifting cord. The cylinder space at one side of the piston is connected through a vacuum pipe of the vacuum line used to effect milking of the cow by means of a vacuum valve which may be actuated by an electronic control device, contained in a closed and separate portion of the cylinder. Upon completion of milking, the piston is then activated to pull the cord and lift the cluster. Because distance between the udder of the cow and the position of the apparatus, with the usual position of the cows in a cow-shed in which the milk line and the vacuum line are secured to the vertical posts carrying the shed roof, the length of the lifting cord is rather large. Therefore, in order to have the milking cluster suspended free from the ground after it has been lifted by the piston, the cylinder must also have a great length to provide a piston stroke of sufficient length. Consequently, in the usually low cow-shed (height 2 meters at the position of the vertical posts) the lower end of the cylinder is positioned close to the ground. Similarly, the cord is suspended in the operative position close to the ground, which gives rise to the danger that the milking cluster touches the ground when it is automatically removed and becomes contaminated.

The present invention aims at removing this danger.

SUMMARY OF THE INVENTION

This is achieved according to the invention by connecting the lifting cord to the upper side of the piston so that it leaves the upper end of the cylinder and thereafter extends downwardly via a guiding element and wherein the vacuum space of the cylinder being formed below the piston.

The lifting cord thereby extends much steeper angle and thereby the milking cluster, when removed, is moved upwardly more directly and along a steeper path, without the need for any complex auxiliary lifting means.

It would, in itself, be possible to turn the cylinder of the known removing apparatus upside down to achieve the same effect. However, then the electronic control device is at the lower end and the vacuum supply and the necessary electric wires must then be guided upwardly on the cylinder exterior towards the electric supply, which is adjacent to the milk and vacuum lines. In this case the wires can be easily mechanically damaged and/or corroded by the shed atmosphere or cleaning liquids so that electric short-circuiting could occur. Moreover, the electronic control device would be exposed to swinging movements of larger amplitude and to shocks, likewise with the possibility of damage.

In a preferred embodiment of the apparatus according to the invention the vacuum tube extends within the cylinder to a point adjacent the bottom of the cylinder space below the piston, while it extends in a slidably sealed manner through the piston.

It is also possible to construct the apparatus such that the vacuum tube extends within the cylinder as a resilient spiral tube, the lower end of which is secured to the piston and sealingly extends through an aperture in the piston in communication with the cylinder space below the piston. However, in this case, the vacuum has to impart a somewhat larger force due to the elasticity of the spiralized tube, which tends to move the piston upwardly.

A further possible embodiment is that in which the vacuum tube opens at the upper end of the cylinder into a vacuum space formed by an inner sleeve in the cylinder. This sleeve communicates through an aperture in said inner sleeve, adjacent the bottom of the cylinder space below the piston with the cylinder space.

Finally an embodiment may be such that the closed cylinder portion having the electronic control device and the vaccum valve is situated below the bottom of the cylinder space situated below the piston. Thereby one has the above-mentioned disadvantages, which possibly may be removed by providing around the electrical wires extending outside the cylinder a further enclosing outer sleeve or by extending the wires through the vacuum tube.

At the upper end of the removing apparatus, parts have been provided for connecting it with the stationary milk and vacuum lines and with the milk and vaccum hose respectively extending to the milking cluster. Simultaneously, a pulsator for controlling the milking machine and a milk flow indicator have been provided, which indicator stops the milking operation when the milk flow issued by the cow drops below a predetermined level, such as in average less than substantially 0.16 kg/per minute.

Preferably the cylinder of the apparatus is suspended by means of a hook or bracket secured thereto from the lower line which usually is the vacuum line. The communication with the lines may be performed through valves and an electric plug. However, the communication may be obtained more easily by a connectable handgrip (commercially known as Twingrip) which is connected to the upper end of the cylinder and carries connecting means for communicating with the milk line and with the vacuum line and has electrical connections such that a milk passage extends through the interior of the handgrip. The milk hose of the milking cluster is connectable to the end of this passage. When connecting the handgrip with the lines, all communication is established automatically. This results in a more compact and lighter assembly when the milk flow indicator is a piece which is sealingly received in a corresponding aperture in the handgrip, which opens into the milk passage, the milk indicator comprising two electrodes projecting into the milk passage, said electrodes being electrically connected at the exterior of the piece to the electronic control device in the cylinder of the apparatus.

The invention will be further explained below with reference to the drawing showing some embodiments, given as examples, of the removing apparatus according to the invention.

BRIEF DESCRIPTION OF THE DRAWINGS

FIGS. 2 to 5 respectively schematically illustrate different embodiments of the cylinder of the removing apparatus shown in FIG. 1;

DESCRIPTION OF THE INVENTION

Figure 1:
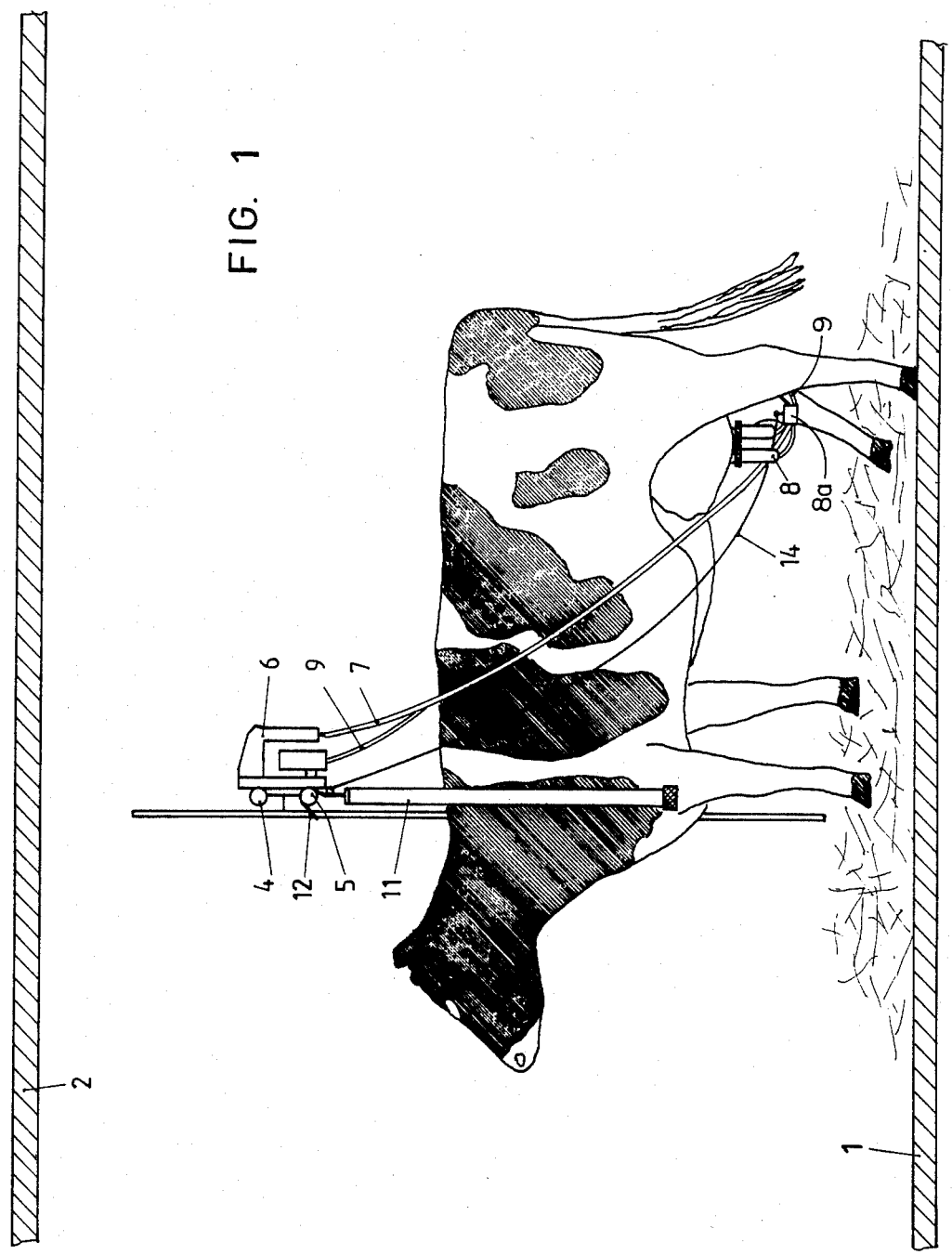
FIG. 1 is a perspective view of part of a cow shed with cow and a milking cluster connected thereto by the removing apparatus according to the present invention.

In FIG. 1, a part of a cow-shed is illustrated in which vertical posts or carrying strut 3 are provided between the floor 1 and the roof 2 thereof. Each strut 3 defines a milking station to either side of which is placed a cow, and has mounted thereon a continuous milk line 4 and a vacuum line 5 in substantially horizontal position, to which a handgrip 6, known per se, is removably connected, as for example, by providing snap connection fittings securable over nozzle like junctions in the conduits 4 and 5. In this manner, line 4 is connected to one end of milk hose 7, the outer end of which is connected to a milking cluster 8 provided conventionally with a valve 8a. Similarly a vacuum tube 9 is connected to the vacuum line 5 and the milking cluster 8 through the valve 8a.

A resilient vacuum tube 10 communicates with a passage in the handgrip (FIG. 2), the other end of said tube being connected to a lifting cylinder 11 in a removing apparatus. The lifting cylinder 11 is suspended by a bracket 12 hooked over in the case as shown, the vacuum line 5.

Figure 2:
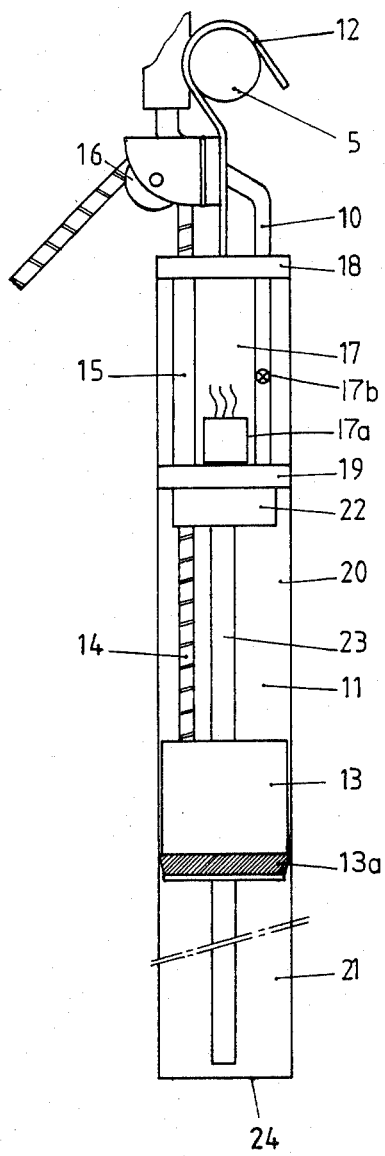

The lifting cylinder, as seen in FIG. 2 comprises a piston 13 carrying a sealing sleeve 13a whereby the piston may be sealingly moved up and down in the cylinder 11. The vaccum tube 10 extends through a sealing means (not shown) through the piston. A lifting cord 14 is connected to the upper end of the piston 13, and extends upwardly through a guide 15, leaving the cylinder 11 at its upper end, over a pulley 16, downwardly to the milking cluster 8. At the upper end of the cylinder 11, a space 17 is provided, in which an electronic control device 17a and a vacuum valve 17b for the vacuum line 10 are received. The space 17 is formed between an upper cover 18 for the cylinder and an internal partition 19. The guide 15 is provided between the walls 18 and 19 and prevents contact between the lifting cord 14 and the electronic elements in the space 17.

The remainder of the cylinder 11 below the partition 19 is divided by the piston 13 into an upper space 20 above the piston, and a lower space 21 below the piston. The vacuum tube 10 extends through the space 17 to a chamber 22 situated below the partition 19, from which a further portion 23 of the vacuum tube extends centrally through the cylinder 11. The tube portion 23 extends freely through the piston 13 and through the sealing sleeve 13a, almost to the bottom wall 24 of the lifting cylinder.

When the handgrip 6 is connected to the conduits 4 and 5 and the electric connection is made, the milking cluster 8 is connected to the teats of the cow, the milking operation is started and the milk is carried by the milk hose 7 to the milk line 4. The vaccum valve 17b in the space 17 is in such position that atmospheric pressure prevails in the space 20 above the piston as well as in the space 21 below the piston. If the milk flow indicator, provided in the apparatus, indicates that the milk production of the cow ends, this indicator issues a signal to the electronic control device, whereby the vacuum valve 17b is switched and vacuum is admitted to the space 21 below the piston. Thereby the piston moves downwardly and the lifting cord 14 is pulled into the cylinder and therewith the milking cluster 8, connected to said cord, is pulled upwardly, which is possible in that simultaneously from the indicator acts on the valve 8a so that the signal also the vacuum in the milking cluster is cancelled permitting the milking cluster to drop from the udder. In that now, contrary to the known removing apparatus, the lifting cord extends towards the upper end of the lifting cylinder 11 and not towards the lower end thereof, the milking cluster moves almost directly from the udder upwardly so that there is no danger that it sweeps the ground.

Figure 3:
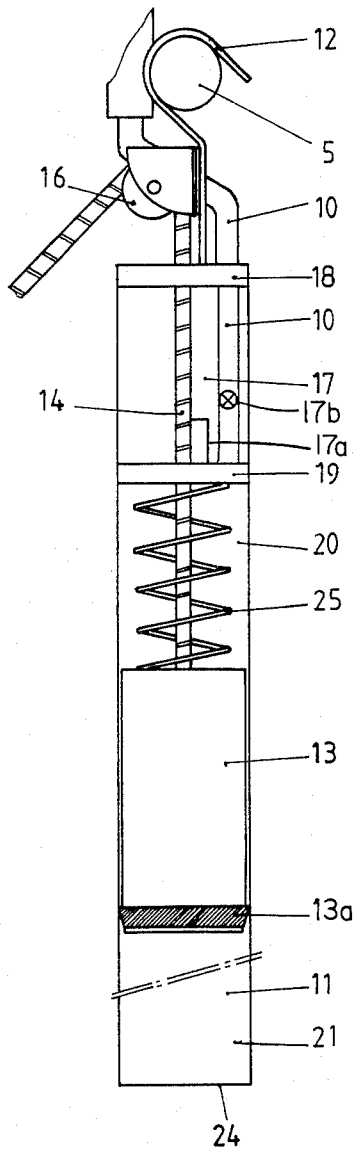

FIG. 3 shows another embodiment in which like or corresponding parts to those in FIG. 2 are indicated by the same reference numbers. Here the apparatus includes the lifting cylinder 11, having piston 13 and the lifting cord 14. However, the central vacuum tube 23 according to FIG. 2 is replaced by a spiral elastic conduit 25, the upper end of which extends, in sealed manner, through the partition 19 to the lower end of the vacuum tube 10. The lower end of the spiral line 25 is in communication through the piston 13 and seal 13a with the space 21 below the piston. Also here the lifting cord 14 is retracted when a vacuum is produced in the space 21 below the piston.

In the embodiment according to FIG. 4, the vacuum connection between the vacuum tube 10 in the space 17 and the space 21 below the piston 13 is obtained by an annular passage leading from one to the other. The lower end of the tube 10 ends in the space 17 and is connected through the partition 19 with a chamber 22 below the partition. The chamber 22 communicates with a hollow tubular vacuum space 26, constituted by an inner sleeve 27 extending from the bottom of the chamber 22 spaced from and parallel to the outer jacket of the cylinder 11 to the bottom wall 24 of the cylinder. Adjacent to the bottom wall 24 is an aperture 28 in the inner sleeve 27, communicating with the space 21.

Finally, another embodiment is shown in FIG. 5. Therein the space 17 for the electronic parts and the valve are provided in the lowest portion of the lifting cylinder 11, below the space 21. The space 20 above the piston has been provided in the area formerly used for the space 17. A vacuum tube 29 extends from a connection with tube 10 through the cover wall 18 in substantially the same manner as according to FIG. 1, through the piston 13, ending above a partition wall 30 separating the space 21 from the space 17. The electric supply line may be provided through the vacuum tube.

Figure 6:
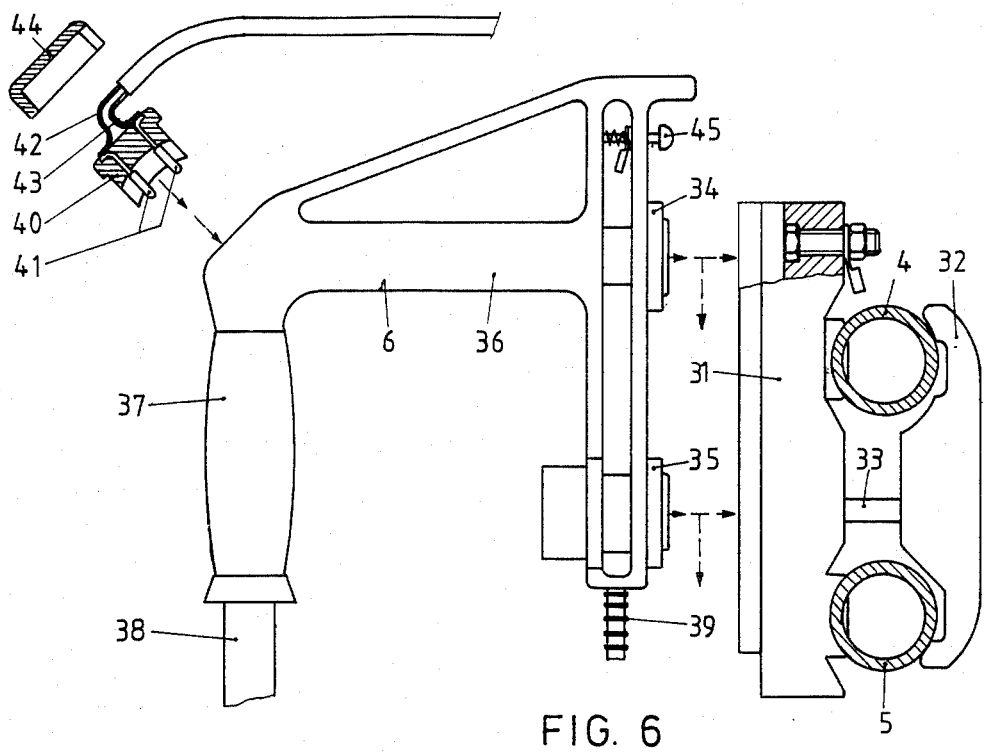
FIG. 6 is a partial sectional view of a special integrated milk flow indicator, used with the removing apparatus of FIG. 1.

In FIG. 6 the movable handgrip 6 of the removing apparatus has been shown on a larger scale. The handgrip is provided with a fixable housing 31, which may be clamped by a hasp 32 and fasteners, such as 33 to the milk line 4 and the vacuum line 5. The housing 31 is hollow and is provided with fittings for forming the junctions with the milk line 4 and the vacuum line 5. The handgrip 6 is attached to the housing by a slide (not shown) which is moved downwardly causing the connecting flanges 34 and 35 to engage with the fittings of the milk line and vacuum line, so that a continuous communication is obtained between the milk line 4 and the flange 34 and also between the vacuum line 5 and the flange 35. If the handgrip 6 is removed from the housing 31, the slide (not shown) is automatically displaced, thereby closing the apertures in the conduits 5 and 6. A passage (not shown) is provided in the flange 34 which extends into the upper leg 36 of the handgrip and in a manual grip portion 37 to an intake spout 38 to which the milk hose 7 is connected. Likewise a passage is provided in the flange 35, which communicates with an intake spout 39 to which the vacuum hose 9 is connected.

In the parts 36, 37, 38 forming the milk passage, preferably in the bight between the parts 36 and 37 an aperture (not shown) is provided in the exterior wall of the handgrip. Preferably the handgrip and the plug are manufactured from plastic material such that a transducer plug 40 seals the aperture when introduced into the handgrip. The transducer plug 40 carries two electrodes which extend into the aperture and into the milk passage. The electrodes 41 are connected through electric wires 42, 43 to the electronic control device in the space 17 of the lifting cylinder. The operation is such that a signal is issued in the control device when the average milk flow through the milk passage decreases below a flow quantity of about 0.16 Kg/per minute. The connection between the electrodes 41 and the wires 42, 43 may be covered with a cap 44 as shown. Thereby a very compact milk flow indicator may be provided on the removing apparatus.

According to the invention also a milkflow indicator may be employed which is further improved relative to that shown in FIG. 6. The improved indicator is schematically shown in FIG. 7 and may also be used with or independently of the handgrip according to FIG. 6.

Figure 7:
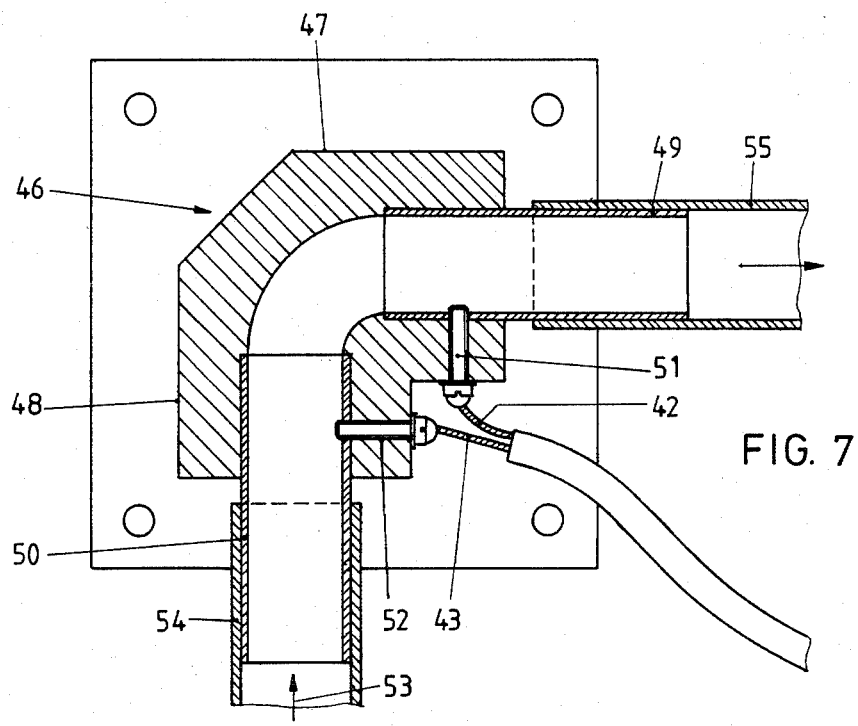
FIG. 7 shows another embodiment of milk flow indicator.

In the milkflow indicator according to FIG. 7 a tubular elbow piece 46, bent at a right angle, and manufactured from plastic material forms a portion of the milk passage. Extending outwardly of each of the legs 47, 48 of the elbow is a conductive metal tube 49, 50, respectively. A contact screw 51 and 52 is secured to the respective tubes extending outwardly where they are connected to electric wires 42, 43. If the milk flows as a pulsating flow from the milking cluster according to the arrow 53 through hoses 54, 55 connected to the respective metal tubes, then a predetermined electrical resistance value may be measured between the two metal tubes 49, 50. Dependent on the fact whether the milk pulses are more or less concentrated the relative resistance will be lower or higher respectively. From this data and the time interval during which a milk pulse passes through the indicator the electronic control device computes the correct moment in time in which the milking cluster must be removed. Due to the fact that the supply tube 50 and the discharge tube 49 have a relative angled position, it is assured that the milk, which is sucked upwardly in the vertical supply portion, is directly discharged after it has reached the horizontal portion. Any milk present in the vertical supply portion connected with the hose 54 moves on the other hand somewhat backwardly or downwardly after each pulse. Should the discharge portion be positioned in the same direction as the supply portion, i.e., vertical, the milk quantity, that has been measured already, would repeatedly activate the measuring contacts 51, 52 so that measurement would become inaccurate.

It is to be noted that the provision of such metal tubes having contacts in a milk line is known per se. However, in the previously known constructions, they are spaced in a straight piece of milk line which is arranged horizontally or substantially horizontally. Thereby one does not obtain the clear interruption in the milkflow as is the case with the device according to the invention.

It will be clear that said milk flow indicator may be inserted into the handgrip according to FIG. 6, in which case the legs 47, 48 of the tubular piece then would form the legs 36, 37 of the handgrip.

I claim:

1. Apparatus for removing a milking cluster from a milking cow, said cluster being connected to the milk line and the vacuum line of an automatic milking machine, comprising a cylinder suspended at one end in a substantial vertical direction and closed at its bottom end, a piston dividing said cylinder into an upper space and a lower space, a lifting cord having one end attached to the upper face of said piston and extending axially outward of the one end of cylinder and thence downwardly over at least one guide means and connected at the other end to said milking cluster, a vacuum tube connectable to said vacuum line and extending axially into said cylinder and sealingly past said upper space into communication with said lower space, electronic control means responsive to the flow of milk through said milk line, and valve means operable by said electronic control means to place said lower space under vacuum, said valve and said electronic control means being located in said cylinder outside of said upper and lower spaces.

2. The apparatus according to claim 1, wherein said vacuum tube extends slidable through said piston and includes means for slidably sealing said tube and piston against flow of air therebetween.

3. The apparatus according to claim 1 wherein said vacuum tube is spirally formed and is axially extendible, the lower end of said vacuum tube extending through said piston and being sealingly secured therto.

4. The apparatus according to claim 1, wherein said cylinder comprises an outer jacket and an inner sleeve spaced therefrom in which said piston is located, said vacuum tube communicating with said space and said inner sleeve having an opening communicating with the lower chamber.

5. The apparatus according to any one of claims 1 to 4 wherein said cylinder is extended below its closed bottom end and the electronic control means and vacuum valve are located in said cylinder extension.

6. The apparatus according to any one of claims 1-4 including a removable handgrip having a first leg defining an air passage connectable to the vacuum tube extending into the upper end of the cylinder, and a second hollow leg forming a milk passage connectable to the milk hose in said milking cluster, said handgrip having means for connection to the milk line and to the vacuum line respectively, and a milkflow indicator, a transducer plug received in a corresponding aperture in the handgrip opening into the milk passage, said transducer plug having two electrodes projecting therefrom into the milk passage, said electronic control device being responsive to the signal produced by said electrodes.

7. The apparatus according to any one of claims 1-4 including a removable handgrip having a first leg defining an air passage connectable to the vacuum tube extending into the upper end of the cylinder, and a second hollow leg forming a milk passage connectable to the milk hose in said milking cluster, said handgrip having means for connection to the milk line and to the vacuum line respectively, the milkflow passage comprising a curved tubular member manufactured from electrically insulating material, and an electrically conductive metal tube provided interiorly of each of the ends of said curved tubular member, and means for indicating the flow of milk through said passage as a function of the electrical resistance between said conductive metal tubes.

8. An automatic milking apparatus having a milk line, a vacuum line and a milking cluster attachable to the teats of the cow, a removable handgrip for attaching the milking cluster to said milk and vacuum lines wherein said cow is induced to provide milk by the vacuum operation of the milking cluster, the milk passing through said handgrip into said milk line, said handgrip comprising a first leg defining an air passage connectable to the vacuum line, and a second leg forming a milk passage connectable to the milk line, said handgrip having means for connection to the milk line and to the vacuum line respectively, and a milkflow indicator, comprising a transducer plug received in a corresponding aperture in the handgrip opening into the milk passage, said transducer plug having two electrodes projecting therefrom into the milk passage, and responsive to the flow of milk thereover to provide a signal thereof.

9. An automatic milking apparatus having a milk line, a vacuum line and a milking cluster attachable to the teats of the cow, a removable handgrip for attaching the milking cluster to said milk and vacuum lines wherein said cow is induced to provide milk by the vacuum operation of the milking cluster, the milk passing through said handgrip into said milk line, said handgrip comprising a first leg defining an air passage connectable to the vacuum line, and a second leg forming a milk passage connectable to the milk line, said handgrip having means for connection to the milk line and to the vacuum line respectively, the milkflow passage comprising a curved tubular member manufactured from electrically insulating material, and an electrically conductive metal tube provided interiorly of each of the ends of said curved tubular member, and means for indicating the flow of milk through said passage as a function of the electrical resistance between said conductive metal tubes.

* * * * *